(12) United States Patent
Kareemi et al.

(10) Patent No.: US 8,840,466 B2
(45) Date of Patent: Sep. 23, 2014

(54) METHOD AND SYSTEM TO CREATE THREE-DIMENSIONAL MAPPING IN A TWO-DIMENSIONAL GAME

(75) Inventors: Nazim Kareemi, Palo Alto, CA (US); Abbas Rafii, Palo Alto, CA (US)

(73) Assignee: Aquifi, Inc., Palo Alto, CA (US)

( * ) Notice: Subject to any disclaimer, the term of this patent is extended or adjusted under 35 U.S.C. 154(b) by 109 days.

(21) Appl. No.: 13/506,474

(22) Filed: Apr. 20, 2012

(65) Prior Publication Data

US 2012/0270653 A1 Oct. 25, 2012

Related U.S. Application Data (60) Provisional application No. 61/517,657, filed on Apr. 25, 2011.

(51) Int. Cl.
*A63F 9/24* (2006.01)
*A63F 13/40* (2014.01)

(52) U.S. Cl.
CPC .......... *A63F 13/10* (2013.01); *A63F 2300/646* (2013.01); *A63F 2300/1093* (2013.01); *A63F 2300/6045* (2013.01); *A63F 2300/1075* (2013.01); *A63F 2300/204* (2013.01); *A63F 2300/105* (2013.01)
USPC .......................................................... 463/31

(58) Field of Classification Search
USPC ........................................................... 463/31
See application file for complete search history.

(56) References Cited

U.S. PATENT DOCUMENTS

| | | | |
|---|---|---|---|
| 8,180,114 B2 | 5/2012 | Nishihara | |
| 2009/0077161 A1* | 3/2009 | Hamilton et al. | 709/203 |
| 2009/0103780 A1 | 4/2009 | Nishihara | |
| 2010/0124949 A1* | 5/2010 | Demuynck et al. | 455/569.1 |
| 2010/0306714 A1* | 12/2010 | Latta et al. | 715/863 |
| 2011/0294574 A1* | 12/2011 | Yamada et al. | 463/30 |

\* cited by examiner

*Primary Examiner* — Steve Rowland
(74) *Attorney, Agent, or Firm* — Michael A. Kaufman, Esq.

(57) ABSTRACT

Natural three-dimensional $(x_w, y_w, z_w, t_w)$ gesture player interaction with a two-dimensional game application rendered on a two or three dimensional display includes mapping acquired $(x_w, y_w, z_w, t_w)$ gesture data to virtual game-world $(x_v, y_v, z_v, t_v)$ coordinates or vice versa, and scaling if needed. The game application is caused to render at least one image on the display responsive to the mapped and scaled $(x_w, y_w, z_w)$ data, where the display and game interaction is rendered from the player's perception viewpoint. The $(x_w, y_w, z_w)$ data preferably is acquired using spaced-apart two-dimensional cameras coupled to software to reduce the acquired images to a relatively small number of landmark points, from which player gestures may be recognized. The invention may be implemented in a handheld device such as a smart phone or tablet, which device may include a gyroscope and/or accelerometer.

8 Claims, 8 Drawing Sheets

METHOD AND SYSTEM TO CREATE THREE-DIMENSIONAL MAPPING IN A TWO-DIMENSIONAL GAME

RELATIONSHIP TO CO-PENDING APPLICATION

This application is a continuation of applicants' U.S. provisional patent application Ser. No. 61/517,657, filed on 25 Apr. 2011, entitled "Method for Casting a 2D Game to Using 3D Input Control".

FIELD OF THE INVENTION

The invention relates generally to creating a three-dimensional ordering of objects in a two-dimensional game application. Generally one can define three classes of such applications. A first class of two-dimensional game applications has an (x, y, z) coordinate system, responsive to at least real-world two-dimensional $(x_w, y_w)$ input from a game player. A second class is similar to the first class but can respond to real-world three-dimensional $(x_w, y_w, z_w)$ input from a game player. A third class of two-dimensional game applications has only an (x,y) coordinate system, responsive to real-world two-dimensional $(x_w, y_w)$ input from a game player, and the resultant game display video rendering, unless modified, lacks a sense of depth distance. Aspects of the present invention can enhance realism for the game player, especially for the first two classes of two-dimensional game applications, and can also enhance realism for the game player if the third class of game applications is modified to work with the invention.

BACKGROUND OF THE INVENTION

Electronic games have long been played on PCs and on dedicated game consoles, including hand-held portable consoles, e.g., GameBoy©, Nintendo DS©, PlayStation©. User input mechanisms to control games have evolved from keyboards, mice, joysticks, track/touch pads, to touch screens, and more recently to three-dimensional natural interfaces. Natural interfaces track can track body parts of the game player using three-dimensional type imaging. Software then discerns the player's desired game control actions from movements of the player's arms, legs, torso, etc. The Kinect© console from Microsoft© uses such a natural interface, and game play is modified, substantially in real time, responsive to perceived movements of the game user's body. (The terms "user" and "player" are used interchangeable herein.)

Challenges associated with inputting three-dimensional commands to a two-dimensional application, typically a video game, will be described generally with respect to FIGS. 1A-1C. These figures depict aspects of a very popular two-dimensional video game called Angry Birds, produced by Rovio;© see http://en.wikipedia.org/wiki/Angry_Birds and http://www.rovio.com/en/our-work/games/view/1/angry-birds. The popular mode of this game application falls into the third class of applications, as defined above. In its simplest form, the user or player aims and fires a virtual slingshot depicted on the game display. The goal is to accurately lob a projectile (an angry bird) from the slingshot towards the target, a rickety structure providing shelter to a herd of pigs. Points are awarded in the game for destroying the shelter and dispatching the pigs by accurately controlling the slingshot and its projectile. It is understood that in this game application, player input and display output are each two-dimensional.

Figure 1A:
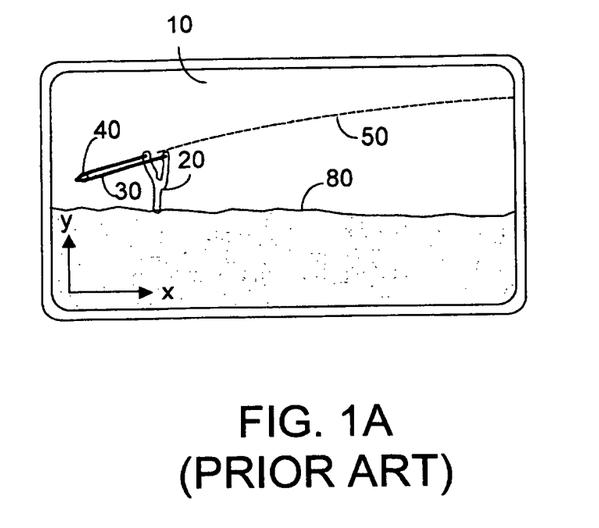
FIG. 1A is a view of the aiming aspect of a two-dimensional video game, according to the prior art.
Figure 1B:
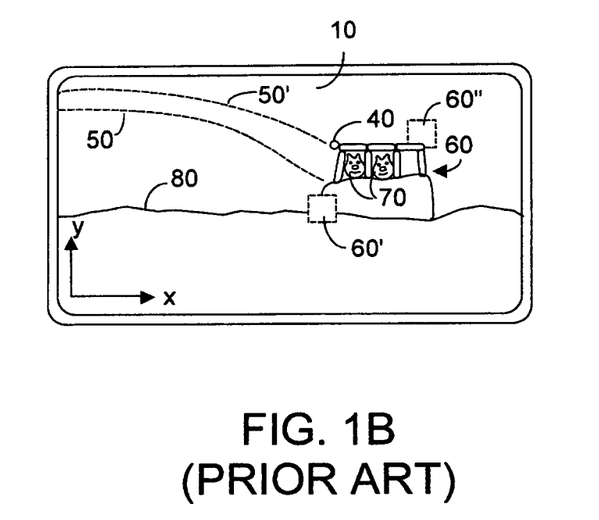
FIG. 1B is a view of the target aspect of the two-dimensional video game shown in FIG. 1A, according to the prior art.

FIG. 1A depicts an aiming scene in the Angry Birds game as it might appear to a user (or player) on display 10 of a monitor associated with the game-playing device. In this example the device is perhaps a hand-held smart phone that executes the AngryBirds game application and includes the display as an integral part of the device. A slingshot 20 with elastic band 30 holds a projectile 40 that is to be launched upon a desired trajectory 50' (see FIG. 1B) by the game player to hit the target (the pig shelter 60 and pigs 70, shown in FIG. 1B). The game shows the last used trajectory 50 to aid the player and making adjustments to arrive at a new trajectory 50', and also shows the ground terrain 80. As suggested by the (x,y) coordinate system shown, virtual projectile 40 can be moved left or right (x-direction) and/or up or down (y-direction), but cannot move into or out of the plane of display 10, which is why no z-axis is depicted. Understandably launching projectile 40 requires the user to cause slingshot 20 to direct a vector force accurately towards the desired target upon a successful trajectory 50'. A true vector force is required in that the quantum of force imparted to projectile 40 must be sufficient to reach the target, and the aiming of the projectile must be accurate enough to hit the target.

When playing Angry Birds on a device with a touch screen, the player can touch the image of slingshot 20 and "pull-back" projectile 40 and elastic 30 in a desired $(x_w, y_w)$ direction to propel projectile 40 toward target 60, 70. In FIG. 1A and FIG. 1B, it is assumed that game coordinates (x,y) and real-world or screen coordinates $(x_w, y_w)$ are superimposed. After aiming, the player releases projectile 40 by taking his or her finger off the projectile image. Assume that the last trajectory 50 was too shallow and that a higher trajectory 50' is now created by the player. FIG. 1B depicts the target aspect of the game and shows that a higher trajectory 50' was successfully achieved, with the desired result that projectile 40 has hit a portion of structure 60. At least a portion of structure 60 will collapse injuring at least one pig 70, sheltering within the structure, and appropriate game points will be awarded. Note that the display in FIGS. 1A and 1B has no notion of depth, as might be seen from the perspective of the game player. As such projectile 40 cannot be aimed at a target 60' "in front of" structure 60, or a target 60" "behind" target 60 because there is simply no sense of depth z in this class three two-dimensional game application.

Some game device manufactures try to promote a sense of three-dimensionality in the display itself. Some game devices might produce a three-dimensional display requiring the player to wear stereoscopic glasses, or perhaps the display will be auto-stereoscopic, which would not require eye glasses to be worn by the player. The Nintendo©3DS© mobile game device uses an auto-stereoscopic display to promote a three-dimensional experience, although the user interface still requires buttons and physical touching.

What is needed is a method and system whereby a two-dimensional game application, be class one, class two, or class three, may be modified if needed and played by responding to true three-dimensional real-world interface and corresponding timing attributes, including natural interface body and limb gestures made by the game player, without need to physically contact the game-rendering device or display. Further such method and system should enable the two-dimensional game application to convert to an integrated three-dimensional input and output framework. Such result could enable the game video display to present a sense of depth along a game display z-axis, as viewed from the perspective of the game player, and should enable the player to alter or define line of sight control in three-dimensional space. The game application could be played on a small, handheld or portable device, without need for physical contact by the game player.

The present invention provides such systems and methods.

SUMMARY OF THE PRESENT INVENTION

The present invention enables a game player or user to input three-dimensional positional and time $(x_w, y_w, z_w, t_w)$ natural gesture commands to an electronic two-dimensional game application, (class one, class two, or class three) and enable the game application to render images on a conventional planar (x,y) display in which there is a notion of ($z_v$ or virtual z-axis) continuous front, middle, back game depth, in additional to virtual game-world coordinate $(x_v,y_v)$ game movements. The game may be displayed and played upon a handheld portable device such as a smart phone, a tablet, etc.

Preferably the present invention maps the $(x_w, y_w, z_w, t_w)$ real-world data created in response to player movement to game-world virtual coordinates $(x_v, y_v, z_v, t_v)$ coordinates, or vice versa. In this notation $(x_w, y_w, z_w)$ are the usual real world geometric (or spatial) three-dimensional measurements and $(t_w)$ is the corresponding real world timing attribute. Similarly, $(x_v, y_v, z_v)$ are the virtual geometric (or spatial) three-dimensional measurements and $(t_v)$ is the corresponding game virtual timing (or clocks) attribute. Communicating duality of such real-to-virtual or virtual-to-real two-way mapping is facilitated by speaking of a unified space/time coordinate $(x_u, y_u, z_u, t_u)$ system between the real and virtual worlds. Depending on the direction of mapping, $(x_u, y_u, z_u, t_u)$ may be $(x_w, y_w, z_w, t_w)$ or $(x_v, y_v, z_v, t_v)$ or a weighted combination of the two. It is convenient to simply drop dimension (t) from the tuple (x, y, z, t) since (t) is implied. Thus, the simplified (x, y, z) expression is understood to include (t) when applicable. Indeed, one can speak of using at least three-dimensional (x, y, z) data, with an implied fourth parameter (t).

Any desired real-world to virtual-world scaling is performed to make player gesture movements realistic to the scale in spatial and timing dimensions of the rendered game image. The game application is then interfaced with to cause the game to respond to the detected player gesture or other movements. Preferably this interaction is perceived from the eye or viewpoint of the player. The presence of real-time generated $(x_w, y_w, z_w)$ data enables game play to be responsive to natural gestures made by the player. One aspect of the virtual world data that is created is the player or an icon or avatar of the player can be rendered on the game display, allowing the player to become part of the on-going game play. In some instances the game application may require some modification to interact with input from the present invention to properly render game-world play and imagery.

Embodiments of the present invention enable the game player to dynamically interact not only with a displayed target, but to also interact with a region in front of or behind the target, since a virtual $z_v$ game-world axis is created. A more realistic and natural game play experience results, using devices as small as a smart phone to execute the game application and to render the game display. Use of three-dimensional input preferably enables a natural user interface, which allows the player to interact with the game by moving parts of the player's body to create gesture(s) recognizable by the game application. Further, use of the present invention allows the game application developer to create display screen content, as seen from the perspective of the game player's eye. One result is that the player may alter or define line-of-sight control in three-dimensional space. Another result is that the player can interact with three-dimensional input with game application rendered displayed object(s) that are perceived in three-dimensional space.

In some embodiments three-dimensional real-world $(x_w, y_w, z_w)$ input to the game application is created using at least two spaced-apart, generic two-dimensional cameras coupled to software to recognize player gestures and movements. However other methods of inputting three-dimensional (x, y, z) data to the game playing device may also be used, e.g., a time-of-flight camera.

Other features and advantages of the invention will appear from the following description in which the preferred embodiments have been set forth in detail, in conjunction with their accompanying drawings.

DETAILED DESCRIPTION OF THE PREFERRED EMBODIMENTS

It is useful at this juncture to consider various permutations of two-dimensional or three-dimensional display, with two-dimensional or three-dimensional input to an application that may be a game application. Table 1 provides a classification overview in which rows show competing display technologies, and columns summarize competing input techniques. Relevant to embodiments of the present invention are entries in Table 1 where some form of three-dimensional input is available, namely table entries denoted [B3], [B4], [C3], [C4], [D3] and [D4]). In Table 1, "2D" and "3D" are used as shorthand to denote "two-dimensional" and "three-dimensional", respectively. The term "collision" in Table 1 refers to the hypothetical meeting of an input object with a game object in real space or in virtual game space, just as a tennis racket (input object) hits a tennis ball (a game object).

grating (or unifying or mapping) the virtual game space coordinate system of a two-dimensional game application with the real-world (x, y, z) three-dimensional coordinates used by a game player to interface with the game. See for example Table 1 entries [A3], [A4], [C3], [C4], [D3], [D4].

Table 1 uses the notation $(x_w, y_w, z_w)$ to refer to real world three dimensional coordinates, and the notation $(x_v, y_v, z_v)$ to refer to game application or virtual world coordinates. These coordinate values define the geometric or spatial attributes of a real or virtual entity. Of course events in real world or virtual world also have a time dimension. For example the game player's fingertip may beat location (5 cm, 10 cm, 20 cm) at time 2200 seconds starting from an arbitrary zero base time. The notation $(x_w, y_w, z_w, t_w)$ thus refers to both geometric (spatial) and timing data of real world objects. There is also a notion of time in the game application that is driven by the internal clock of the application, which game application internal clock may be related to or may be completely independent of world time. A virtual world coordinate is thus defined by the notation $(x_v, y_v, z_v, t_v)$ where $t_v$ defines the time dependent values of virtual world objects or events. As noted earlier, it is convenient herein to simply drop dimension (t) from the tuple (x, y, z, t) since (t) is implied when acceptable. Thus the notion used here is generally of the simplified form (x, y, z).

In Table 1, entry [C3], the real-world $(x_e, y_e, z_e)$ coordinates of the player's eye or view point is unknown, and it is necessary to construct approximately where that location would be. A rough analogy might be the viewing of a movie by a patron in a movie theater. The patron sees the film from the perspective of the camera(s) that captured the scene,

TABLE 1

| [A1} | [A2] 2D Input (e.g. mouse, touch, buttons) | [A3] 3D input control (e.g., non-touch hover) | [A4] 3D Player eye position input (e.g. through head and/or face tracking) plus 2D or 3D input control |
|---|---|---|---|
| [B1] 2D display: Planar 2D views of the scenes are shown. Motions are exclusively in x (horizontal) and y(vertical) directions. | [B2] Input is in the same planar (x, y) coordinate of display screen. | [B3] Input provides additional z coordinates. If the game is not programmed for handling z, z data will remain unused. | [B4] |
| [C1] Perspective 3D display. The game creates virtual 3D scenes and perspective projection of the scene is displayed on the screen. | [C2] Input is only possible in (x, y) coordinates of screen. For simulating an event like collision, the game must define a virtual z plane in the game that maps to the screen. When an object crosses this virtual plane, it can be interacted with using touch or mouse events. | [C3] Input is enabled in any (x, y, z) location in the game, within constraints, e.g., 3D input field of view. Simulating events like collisions and use two options: (a) the game transforms the real $(x_w, y_w, z_w)$ input coordinates to virtual(x, y, z) game coordinates of the game; (b) the game transforms virtual game coordinates to real-world $(x_w, y_w, z_w)$ input coordinates. The collision is resolved in either integrated coordinates. | [C4] Use the real world eye $(x_e, y_e)$ or $(x_e, y_e, z_e)$ location with respect to the screen as a hint for a virtual camera position to couple the perspective 3D display to the eye position. |
| [D1] True 3D display (3D output). The game creates the illusion that scenes are materialized in real 3D world. | [D2] Input is only possible in XY coordinates of screen. Use of buttons or an auxiliary touch surface constraints the game control. The direct and realistic interaction with game objects is not achievable or severely constrained. | [D3] Input is enabled in any XYZ location in the game (within 3D input field of view and constraints). For simulating events like collisions, the preferred option is that the game transforms the virtual coordinates of the game to the real $(x_w, y_w, z_w)$ coordinates of input. The collision is resolved in the illusion of the real world coordinates. | [D4] Same usage as [C4]. Except the scene shall be rendered in 3D from the perspective of the player eye subject to the angular limitation of the underling 3D display technology. |

An understanding of the noted entries in Table 1, above, is relevant to understanding the challenges associated with integrating rather than from the perspective of his or her own eyes. What is thus viewed is a two-dimensional image, and even if the patron gets up and changes seats in the theater, what is viewed on the movie screen remains the same. In [D3] the film could be a three-dimensional film, but on in which all viewing angles are constrained to be from the same perspective, namely the view point of the camera(s) that captured the film image.

By contrast, in Table 1 entry [C4], the actual real-world ($x_e$, $y_e$, $z_e$) coordinate of the player's (or patron's) eye is known, and the scene that is viewed is drawn or rendered accordingly. The movie patron sees the scene not from the vantage point of the camera(s) that recorded the scene, but rather from the patron's own vantage point. If the patron gets up and changes seats in the theater, what is viewed on the movie screen changes. Indeed change could occur if the patron simply rotated his or eye head for a better view. Thus with respect to [C4] systems, the film is truly three-dimensional and viewing angles change with the position of the patron's eye or point of view. The remaining entries in Table 1 are self-explanatory to those skilled in the relevant art and need not be further described herein.

In conventional prior art implementations, the device executing the game application seeks to match the location of slingshot 20 with respect to target 60, 70. Game software then displays projectile 40 moving towards the target along a mathematically determined rendered trajectory, i.e., 50'. If accurately aimed, the projectile smashes into the target, and the resultant mayhem is computed and rendered on display 10 by the game application software, using virtual game software coordinates. Game rules determine points earned for the player, etc. Some prior art approaches have a notion of projecting internal game space onto the display screen. But, absent true three-dimensional input from the player, such games cannot render a display and game experience that mimics realistic three-dimensional player interaction with the game. For example, in prior art FIG. 1B the user cannot interact with an object 60' that in the game space is "in front of target 60, nor can the user interact with an object 60" that in the game space is "behind" target 60. Absent true three-dimensional player input, the user typically is limited to interacting with target 60 (which includes pigs 60) but is precluded from interacting with targets on a different z-plane in the virtual game space world.

For purposes of the present invention, it is relatively unimportant how real-world three-dimensional ($x_w$, $y_w$, $z_w$) information is created. However preferably this data is generated substantially in real-time, and is true three-dimensional data that has been corrected for any distortion associated with the gathering of the data, including optical distortion associated with data-gathering cameras. Thus the expression ($x_w$, $y_w$, $z_w$) is understood to refer to true, undistorted, three-dimensional real-world input data.

Figure 2A:
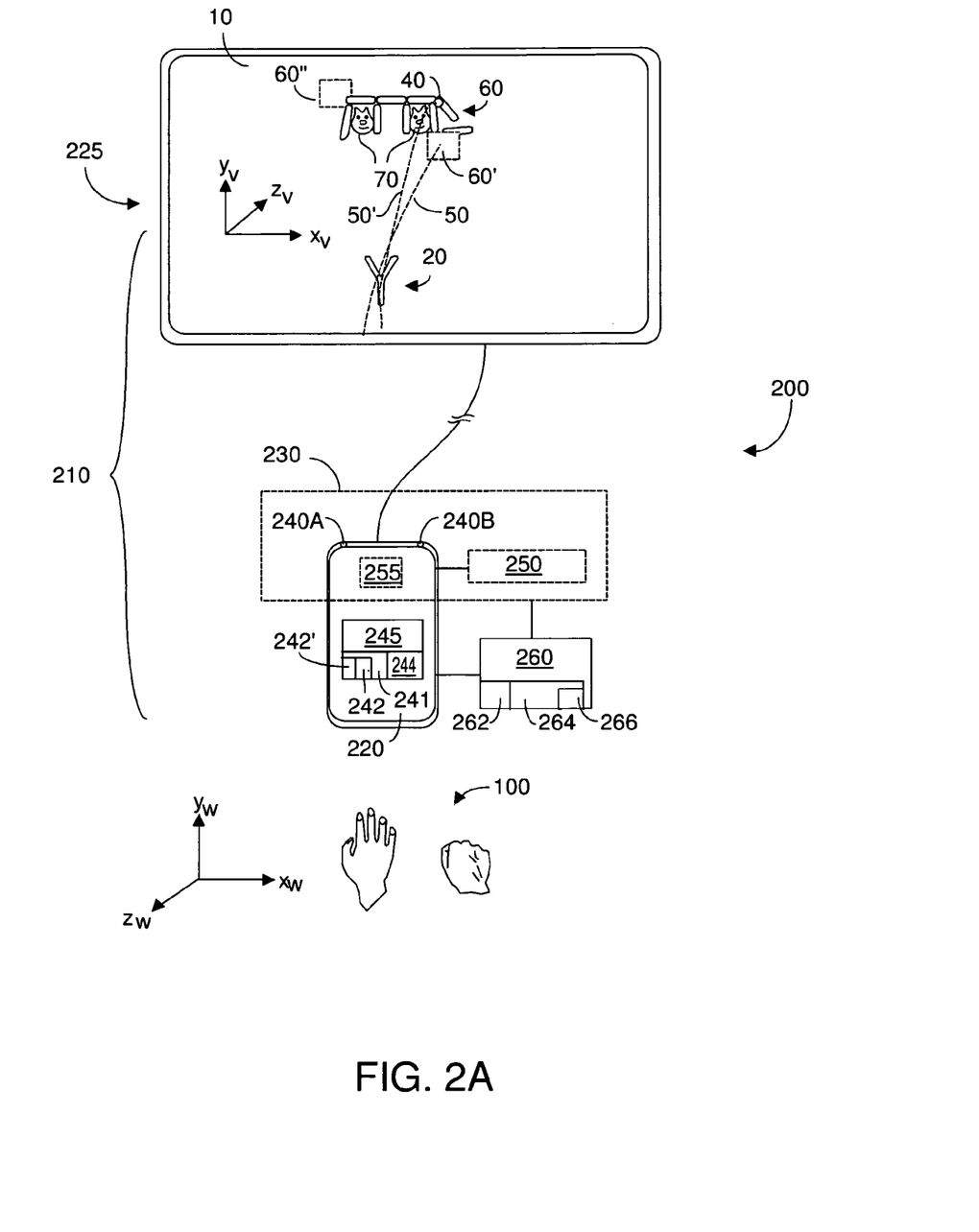
FIG. 2A depicts a system according to the present invention in which three-dimensional input is implemented using spaced-apart generic two-dimensional cameras, and in which a display separate from a device capturing the player input may be used, according to embodiments of the present invention.

FIG. 2A depicts a system 200 that includes an embodiment 260 of the present invention. A device or game playing device 220 includes system 245, which will include memory 241, within which is stored game application 242 and, if modified, 242', and processor 244, which executes software including game application 242, 242'. Game device system 245 may further include firmware and hardware. In a preferred embodiment, there preferably is sharing of processing and/or memory functions between game system 245 and system 260. System 260 is shown as including at least a processor 262, and memory 264 including at least one executable routine 266 to carry-out the present invention. However in practice, processor functionality and memory functionality between game device system 245 and system 260 are preferably shared. Thus, in system 260, processor 262 may in fact be processor 244 in system 245, and in practice, memory 264 may be part of memory 241 in system 245. Further software 266 in system 260 may be stored in memory associated with system 245 in gaming device 220. System 200 includes a game-playing capable device 210, shown here as including a device 220 coupled (via circuit traces, wire, or wirelessly) to monitor 225 that renders display 10. In FIG. 2A, monitor 225 may alternatively be considered as showing, in larger size, what appears on a display 10, if present, on device 220. Many devices 220 include gyros, accelerometers, and the like, shown generically as 255. Devices 220 that include such mechanisms 255 enable a player 100 to physically tilt and/or rotate the device to influence game play. System 200 also includes system 260, implementing the present invention. Data from accelerometer 255 can be used to determine orientation of device 220, that is, how player 100 may be holding the device (which device could of course be stationary on a table top). By way of example, by sensing orientation of device 220, systems 230 and/or 260 can swap $x_w$ and $y_w$ data, and applications(s) 242 can re-orient the content rendered on display 10, landscape to portrait mode, perhaps. Of course in some embodiments player 100 can interact with device 220 when the device is stationary, perhaps sitting on a desk.

In FIG. 2A (as well as in FIG. 2B) module or system 230 represents a preferred method to implement three-dimensional gathering functionality for system 200, whereby movements, gestures, etc. of player 100 (shown as a clenched and as an open player right hand) can be tracked substantially in real-time in real-world coordinates ($x_w$, $y_w$, $z_w$). (Other methods or systems to gather such real-world coordinates ($x_w$, $y_w$, $z_w$) in real-time may of course be used). Note that display 10 in FIG. 2A combines the aiming mechanism, e.g., slingshot 20, and the target 60 in a single display. In a preferred embodiment system 230 includes spaced-apart two-dimensional cameras 240A, 240B that are coupled to software 250, which processes the optical image data gathered by the cameras. A preferred method and system to implement detection system 230 is set forth in pending U.S. patent application Ser. No. 13/385,134, filed 3 Feb. 2012, entitled "Two-Dimensional Method and System Enabling Three-Dimensional User Interaction With a Device", assigned to Imimtek, Inc. of Sunnyvale, Calif., assignee herein. In brief, cameras 240A, 240B substantially simultaneously capture from their respective vantage points two-dimensional images of at least a portion of game player 100 as gestures and the like are made, perhaps with the free right hand, with body movements, etc. The camera sensors detect RGB, monochrome, or even IR spectral energy, but need not be identical in terms of resolution and fields of view, or even spectral sensitivity.

The overlapping fields of view of the two cameras define a three-dimensional hover zone that can include the surface of display 10, a three-dimensional space within which player gestures may be captured optically and interpreted. Preferably the cameras are pre-calibrated and are mounted at opposite corners of device 220 to better capture player gestures. Aggregated frames of two-dimensional information acquired by the cameras are communicated at a frame rate for processing by an electronic system, associated with module 250 in FIG. 2B. Signal processing upon this two-dimensional information can identify potential landmark points on the player as needed representing imaged object(s), perhaps the centroid of player's right hand, the tip of a finger, etc. In essence the imaged player is skeletonized for representation by a relatively small number of landmark points, typically fewer than about one hundred potential landmarks, and perhaps only a dozen or so landmarks. Signal processing within module 250 then yields three-dimensional ($x_w$, $y_w$, $z_w$) data for the relatively few landmark points defined on the imagery acquired by cameras 240A, 240B. In this manner, module 250 can operate rapidly, substantially in real-time, using inexpensive components to yield three-dimensional reconstruction of relevant landmark points. Gesture recognition is carried out by module 250, from which the gesture recognition data goes to system 260. The gesture recognition data may be fed back to the game application 242, 242', which as noted is typically disposed within game device system 245, to alter game play imagery rendered on display 10 in response to detected player interaction. The above-described Imimtek, Inc. method may be implemented exceedingly inexpensively using generic components having a resultant tiny form factor. The described method can be implemented in mass production for less than about $10, e.g., using generic two-dimensional cameras such as OmniVision model OV7740 VGA, see www.ovt.com, which cameras in quantity cost less than about $1. While horizontal and vertical camera FOVs of 90° would be ideal, the narrower 40°-50° FOVs of OmniVision model OW740 VGA cameras work acceptably in practice.

In a preferred embodiment, spaced-apart two-dimensional cameras 240-A, 240B are disposed at opposite corners of device 220 such that their overlapping optical fields of view (FOV) define a three-dimensional zone in which the cameras can image at least portions of the game player 100. The cameras can be mounted such that the overlapping FOV grazes the surface of display 10, to also detect (if desired) physical contact by player 100 with the surface of display 10. In FIG. 2A, device 220 might be a handheld smart phone equipped with system 230, and coupled to display video on monitor 225. In FIG. 2A, unlike what was described with respect to FIGS. 1A and 1B, player 100 can aim projectile 40 at target 60' disposed in front of primary target 60, and can also aim projectile 40 at target 60" disposed behind target 60, as there is indeed a sense of depth $z_v$ in the virtual game space $(x_v, y_v, z_v)$ that is now present. As such, embodiments of the present invention present player-interactable depth regions on display 10, e.g., targets 60', 60", in addition to target 60. For purposes of generality, FIG. 2A depicted a game playing device 220 functionally coupled to a separate monitor display 225, 10. However in practice, it is more useful to provide a device 210 whose common housing includes the game playing device and the display, among other components and systems, and preferably including system 260. As will now be described with respect to FIGS. 2B and 2C in many embodiments, system 200 includes a device 220 that includes monitor 225 (and display 10) as well as systems 230 and 242, 245 as an integral part of the device, all in a common housing. Thus it is understood that the game playing device may be referred to as 210 or as 220. Further, as noted earlier, functionality of much if not all of system 260 preferably can also be disposed in the same housing as device 220 and display 10, etc.

In FIG. 2A, system 230 generated $(x_w, y_w, z_w)$ data is coupled to the present invention, system 260, which maps this real-world data to game-world virtual coordinates $(x_v, y_v, z_v)$ coordinates and performs any real-world to virtual-world scaling as may be desired, e.g., to make player gesture movements realistic to the scale of the rendered game image. System 230 then interfaces with game application 242, 242' and game system 250 to cause the game to respond to the detected player gesture or other movements, which interaction preferably is perceived from the eye or viewpoint of the player. The presence of real-time generated $(x_w, y_w, z_w)$ data enables system 260 to cause the game application to respond to natural gestures made by player 100. One aspect of the virtual world data that is created is the player or an icon or avatar of the player can be rendered on display 10 to become part of the on-going game play.

Figure 2B:
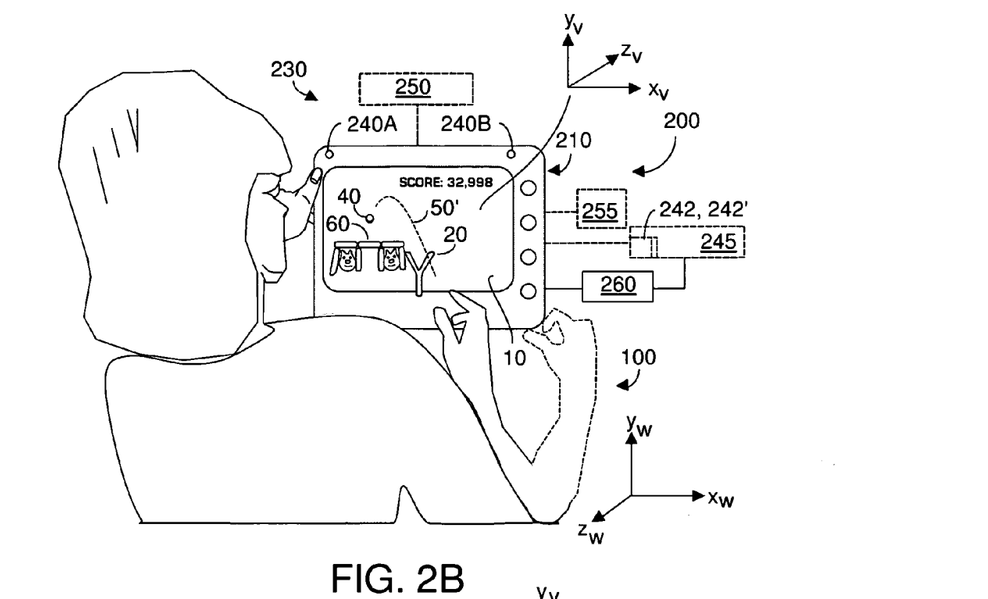
FIG. 2B depicts a system according to the present invention in which three-dimensional input is implemented using spaced-apart generic two-dimensional cameras and associated software, and in which a portable game-playing device houses the present invention, cameras and software that acquire three-dimensional game player data, as well as the game-playing system and display, according to embodiments of the present invention.

FIG. 2B depicts an embodiment of the present invention in which system 200 is implemented as a single portable device 210 that includes system 230 (cameras 240A, 240B, module 250), as well as module 242, 242', 245, and if present gyro, accelerometer components 255. Preferably all of these components or systems or modules are disposed in the housing or case for device 220. In FIG. 2B, screen display 10 is shown with rendered images of an aiming device 20 (a slingshot), a target 60 (replete with pigs), a projectile 40 that has traveled along a player determined trajectory 50'. Many devices 210 include gyros, accelerometers, and the like, shown generically as 230. Devices 210 that include such mechanisms 230 enable a player 100 to physically tilt and/or rotate the device to influence game play. In the embodiment of FIG. 2B, player 100 is holding device 210 in her left hand, which may be used to tilt, rotate the device, and has also created a gesture with her right hand in firing slingshot 20. For example, data from an accelerometer or gyroscope can be used to determine orientation of device 220, that is the manner in which the user is holding the device. As noted earlier, orientation data sensed by device 210 can enable systems 230 and/or 260 to swap $x_w$ and $y_w$ data, whereupon software applications(s) 242 can re-orient content rendered on display 10. Note that the embodiment of FIG. 2B (and also FIG. 2C) optionally includes a three-dimensional display 10. Display 10 may be auto-stereoscopic or may require user 100 to wear stereoscopic glasses. Thus in the three-dimensional output that is optionally provided, virtual slingshot 20 appears to player 100 to hover in three-dimensional real-world space. (see all FIG. 3D, in which virtual target object 130' also appears to hover in three-dimensional real-world space.) It is understood that a display 10 capable of outputting three-dimensional imagery may be provided for other embodiments of the present invention. Alternatively, display 10 may simply output conventional two-dimensional imagery, for use with embodiments of the present invention.

In the embodiment of FIG. 2B, three-dimensional input data is again preferably obtained using system 230 comprising preferably pre-calibrated cameras 240A, 240B, and module 250, as described above with respect to FIG. 2A. As noted, preferably system 230 is built into the housing of device 220. Preferably cameras 240A, 240B, e.g., OmniVision model OV7740 VGA units, are disposed at opposite corners of display 10, to provide a good overlapping of their respective FOVs, the better to capture gestures and other movements by player 100. Functionality of module 250 preferably is as described above with respect to FIG. 2A. While an Imimtek, Inc. method of acquiring three-dimensional data representing player gestures is inexpensive and readily mass-producible, the present invention may be implemented independently of how the $(x_w, y_w, z_w)$ data is generated.

In the embodiment of FIG. 2B, player 100 can better visually control the slingshot trajectory using natural gestures, perhaps opening and closing the right hand, moving the right hand, etc. in real-world $(x_w, y_w, z_w)$ three-dimensional space. Depending upon implementation, the centroid position of the user's hand relative to say display 10 will be discernible to the game system 245, 242, 242'. The player might close the fingers of the right hand (to grasp projectile 40) and move the right hand left or right, up or down (in the x-y plane) to aim the projectile. Moving the hand away from or toward display 10 (along the z-axis, in the real world) could impart greater or less tension to the slingshot. The player could then open the fingers to release the projectile. The game application software then creates and renders the trajectory corresponding to the vector force and aiming applied by the player to the slingshot. Typically the game application includes a gravity model that tries to realistically influence the selected trajectory, to promote realism. In FIG. 2B as well as in FIG. 2C, system 260 implementing embodiments of the present invention preferably is as described with respect to FIG. 2A. Thus, processor, storage, and executable software functionality in system 260 may be shared with such functionality found in system 245 of the gaming device, e.g., processor 244, memory 241.

Figure 2C:
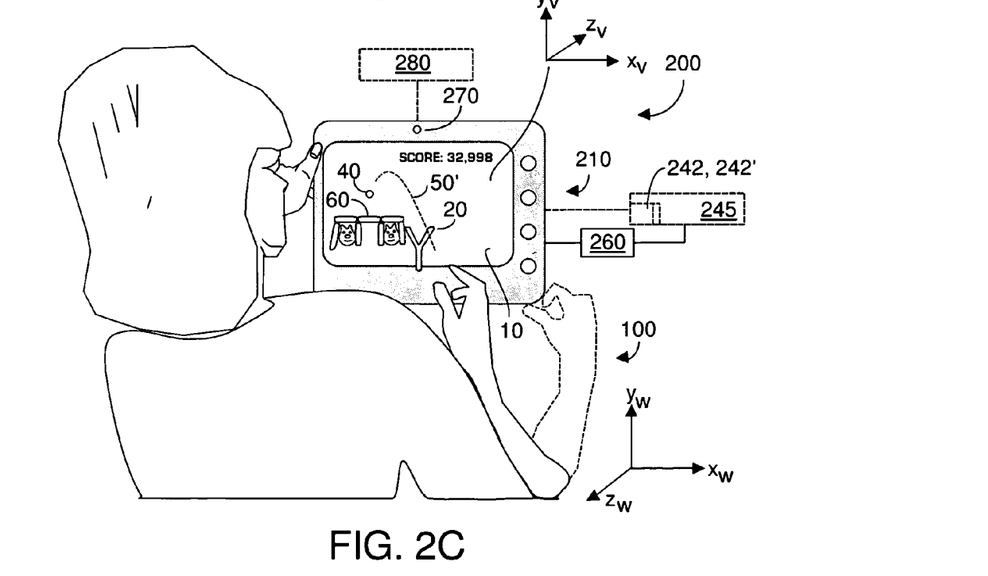
FIG. 2C depicts a system according to the present invention in which three-dimensional input is implemented using time-of-flight (TOF) technology and in which a portable game-playing device houses the present invention, the single TOF camera and software that acquire three-dimensional game player data, as well as the game-playing system and display, according to embodiments of the present invention.

FIG. 2C depicts an embodiment of the present invention that gathers three-dimensional input data representing player movement using a time-of-flight (TOF) camera 270 and associated electronic system module 280. TOF camera emits active optical energy of known phase, some of which is reflected back toward the camera by portions of player 100. Module 280 can determine vector distance $(x_w, y_w, z_w)$ to regions of player 100 by comparing phase shift between active emitted optical energy and player reflected-back optical energy. Descriptions of exemplary TOF systems may be found in the many U.S. patents obtained by Canesta, Inc. of Sunnyvale, Calif., which patents are now assigned to Microsoft, Inc. of Redmond, Wash. Of course methods of generating three-dimensional input data other than using Imimtek, Inc. technology, or Canesta, Inc. technology may be used, for example, use of structured light methodology. Note too that in FIG. 2C display 10 is (optionally) a three-dimensional output device able to display three-dimensional images, with the result that virtual slingshot 20 appears to player 100 to float in real-world space.

Figures 3A, 3C:
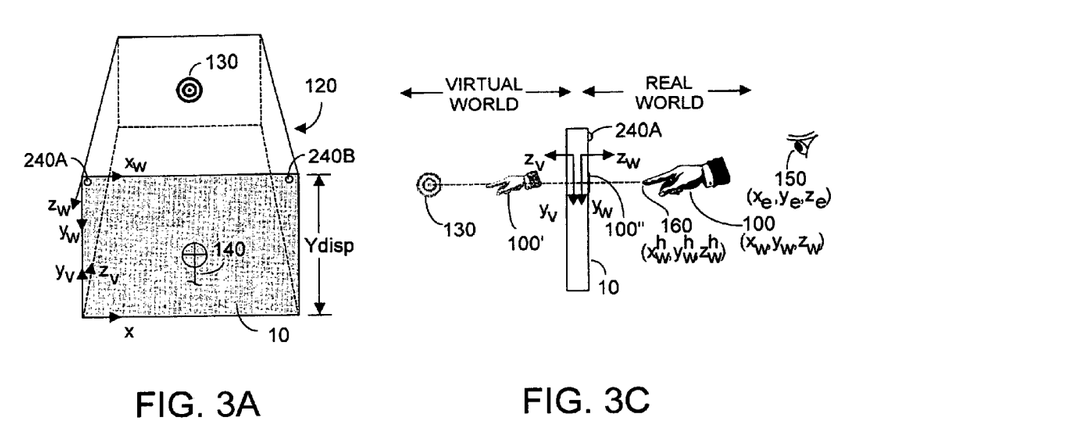
FIG. 3A depicts a game application rendered display of virtual three-dimensional game space, according to embodiments of the present invention.
FIG. 3C depicts the effect of introducing translation changes into the mapping software, to alter the apparent position of the game player vis-à-vis the virtual game space, using three-dimensional input, according to embodiments of the present invention.

Assume then that real world three-dimensional $(x_w, y_w, z_w)$ input player data is being generated for use by the present invention, the precise method of generation not being critical. Referring now to FIG. 3A-FIG. 3D, without loss of generality, representations of virtual world game space and various real-world three-dimensional space are depicted generically for exemplary games including two-dimensional games such as Angry Birds. In visualizing FIG. 3A, it is understood that shaded plane 10 is the front display plane, and the plane where target 130 appears to be in FIG. 3A is further back, e.g., in the back of game space 120.

FIG. 3A depicts display 10, whereon the game application renders the illusion of a three-dimensional virtual world (i.e., game space) 120 that includes target 130 (perhaps shelter 60, pigs 70) and an aiming crosshair sight 140 (perhaps slingshot 20). The virtual three-dimensional game space has its own three-dimensional coordinate system $(x_v, y_v, z_v)$. Without loss of generality, the $(0_v, 0_v, 0_v)$ origin of this virtual three-dimensional coordinate system is shown anchored to the lower left corner of display screen 10, although it could of course be anchored elsewhere. In FIG. 3A, a three-dimensional real-world input coordinate system $(x_w, y_w, z_w)$ is defined with respect to an origin $(0_w, 0_w, 0_w)$ anchored to the upper left corner of display screen 10, although it too could be defined with respect to another location. In this example, the offset between the centers of the two coordinate systems is essentially the height $(Y_{disp})$ of the display screen, a readily discernible dimension. Clearly, one could map the two coordinate systems to the same location point (e.g., perhaps both to the upper left corner of the display screen), in which case the offset parameter would be zero. The rotational (angular) offset, typically referred to as $(\Theta_x, \Theta_y, \Theta_z)$ between these two coordinates systems is defined in radians or angles and is assumed to be zero in FIG. 3A, although non-zero values can also be defined.

Figure 3B:
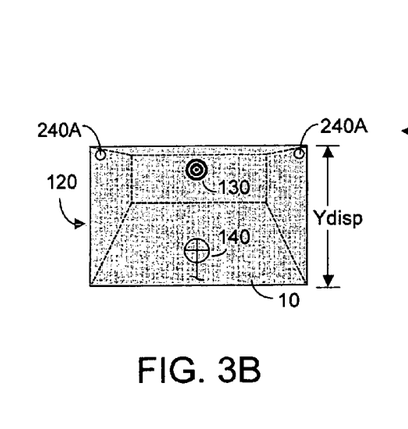
FIG. 3B depicts the display of FIG. 3A, but as seen from a player who is now crouching down vis-à-vis player position in FIG. 3A, according to embodiments of the present invention.
Figure 3D:
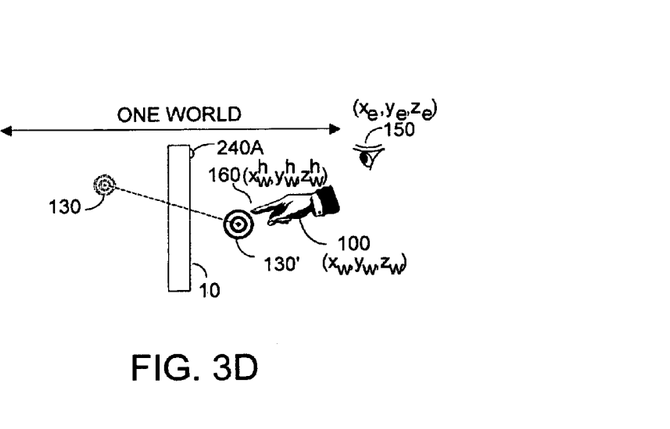
FIG. 3D depicts integration of the virtual game space world with the real world, using three-dimensional input, and a three-dimensional display, according to embodiments of the present invention.

Consider now FIG. 3B and FIG. 3D. According to an aspect of the present invention, three-dimensional real-world $(x_w, y_w, z_w)$ coordinate data is produced for use by the game application. For example, in FIG. 3D, game player 100 (whose eye and view point is denoted 150, and whose right pointing fingertip is denoted 160) occupies the real world, and looks at display surface 10. A relationship between real world three-dimensional coordinates and virtual game space coordinates is needed if the game player is to successfully observe and interact with the two-dimensional virtual world as rendered on display 10. Real world coordinates are denoted as $(x_w, y_w, z_w)$, and software provided by the present invention can produce real world data, such as the coordinates $(x_w^h, y_w^h, z_w^h)$ for fingertip 160, as well as other relevant coordinates for portions of the body of player 10, in a natural interface embodiment. Note in FIG. 3D that display 10 demarks the boundary between the real world, e.g., the world external to the viewing surface of the display, and the virtual game world, e.g., that which is rendered as viewable imagery on display 10.

Defined below is a preferred linear three-dimensional transformation that maps real-world three-dimensional input coordinates to virtual game world coordinates, according to embodiments of the present invention. For ease of explanation, at this juncture it is assumed that any optical distortion associated with the acquisition of natural interface three-dimensional input data by the game system is either negligible or has already been corrected. The preferred transformation is given by:

$$\begin{Bmatrix} x_v \\ y_v \\ z_v \end{Bmatrix} = R \cdot \begin{Bmatrix} x_w \\ y_w \\ z_w \end{Bmatrix} + T$$

where R and T may be conventional rotation and translation matrices from real-world coordinates to virtual world coordinates.

A scaling factor may be introduced into the above transformation to account for differences in measurement units. For instance, the game application may require a 10 cm movement by the player in the real world to represent a 10 m distance in the virtual game world. It is understood that each of the three dimensions (x, y, z) may have its own, different, scaling factor value. The same scaling may be applied to other terms, such as time, velocity, inertia, etc., associated with game movements, user gestures, etc. coupled to the game system.

Using the above preferred transformation, player created real-world three-dimensional input data can be represented in the same three-dimensional virtual world, along with objects that are rendered (or materialized) in the three-dimensional game space. In the above transformation, the definition of R will depend upon the values and effects that the game application engine wants to achieve, although in the simplest form, R could be a unity matrix. The game application engine can also alter values for T.

Those skilled in the art will recognize that for visual purposes the images of such three-dimensional real world and virtual world objects can be rendered on a display screen using the usual parallel or perspective projections.

Thus in FIG. 3C using appropriate values of R and T a transformed virtual representation of at least a part of player 100 is rendered as virtual player portion 100' as though immersed in game-world space. This corresponds to Table 1, entries [C3] or [C4]. It is obviously useful to the player to "see" where the game application thinks his hand 100 is in game-world space. The virtual game-world location of player portion 100' preferably is rendered to appear projected as 100" at a computed location on two-dimensional display screen 10 in FIG. 3C to provide feedback to the player as to movement of hand 100. This game world space location will be commensurate with the perceived position of player portion 100 in the real world with respect to the virtual target 130.

The three-dimensional output data generated by software associated with embodiments of the present invention may be used to extend the virtual game world into the real world, as shown in the embodiment of FIG. 3D. This corresponds to Table 1, entries [D3] or [D4]. Assume in the embodiment of FIG. 3D that a three-dimensional display is rendered, e.g., perhaps using a holographic display, or a three-dimensional display for which the game player will wear stereoscopic glasses, or perhaps using an auto-stereoscopic display. In this one-world embodiment virtual target 130 is created by the game application in the virtual world and appears to be moved into the real world as target 130', which may appear to the player to float in real-world three-dimensional space with player hand object 100. In this embodiment, to promote realism, scaling of motion properties (velocity, acceleration, direction) in the virtual world should match the corresponding metrics in the real world. Advantageously this is achieved because the three-dimensional input produces $(x_w, y_w, z_w)$ data substantially in real-time. What remains is to set the game application time clock to match the real world clock, as perceived by player 100 to further promote realism of the game play.

In the embodiments of FIG. 3C and FIG. 3D, the present invention can, if desired, cause scenes to be rendered on display 10, from player 100's line of sight 150. In such embodiments, if the user's eye(s) are within the field of the three-dimensional real world optical acquisition system, e.g., within the field view of spaced-apart cameras 240A, 240B (embodiment of FIG. 2B), within the field of view of TOF camera 270 in the embodiment of FIG. 2C, etc., the player's eye can be located in three-dimensional real world space. The three-dimensional location of the player's eye 150 can then be used as the location position of a virtual camera position. Note, however, that the location of a virtual camera position refers to a computer graphics meaning of the term and not to the physical location of the optical camera(s), e.g., 240A, 240B, or TOF camera 270 used to acquire real-world imagery. Even if the position of the player's eye 150 cannot be discerned in real-world three-dimensional space, embodiments of the present invention can use calibration information to remove distortion from the image acquired by the optical camera(s) and thus determine the correct optical ray associated with the physical location of the player's eye 150. Even if the player's face is not completely visible to the acquiring camera(s), the image will nonetheless include clues, e.g. shoulder, neck, left and right hands, useable to detect an approximate location of the player's eye 150. Some prior art techniques demonstrating the use of head tracking to look at different views of a three-dimensional rendering are found at http://www.youtube.com/watch?v=7saRtCUqbNI and at http://www.youtube.com/watch?v=bBQQEcfkHoE. Unfortunately such prior art mechanisms do not output $(x_w, y_w, z_w)$ data that is undistorted, or has been corrected for distortions including optical distortion. Use of distorted $(x_w, y_w, z_w)$ data (or distorted $(x_w, y_w)$ data can result in inaccurate positioning and unrealistic game play as perceived by the player.

In practice, optical calibration associated with the lens in data-gathering cameras 240A, 240B, or in the time-of-flight embodiment, associated with TOF camera 270, wants to be accounted for to minimize inaccuracies. For example, uncorrected camera lens distortion can produce erroneous location coordinates for the game player's head with respect to the camera(s), especially if the head moves to a location beyond the overlapping field of view of two-dimensional cameras 240A, 240B. In the embodiment of FIG. 2B, unless two-dimensional cameras 240A, 240B were calibrated to remove lens distortion, the location of the player's head could only approximately be discerned in three-dimensional space.

Figure 4A:
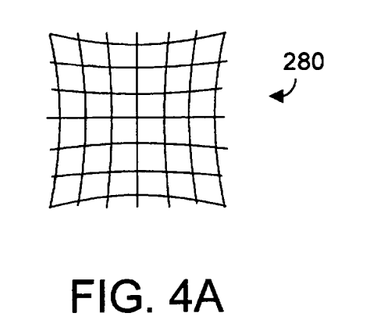
FIG. 4A depicts uncorrected pincushion distortion, according to the prior art.
Figure 4B:
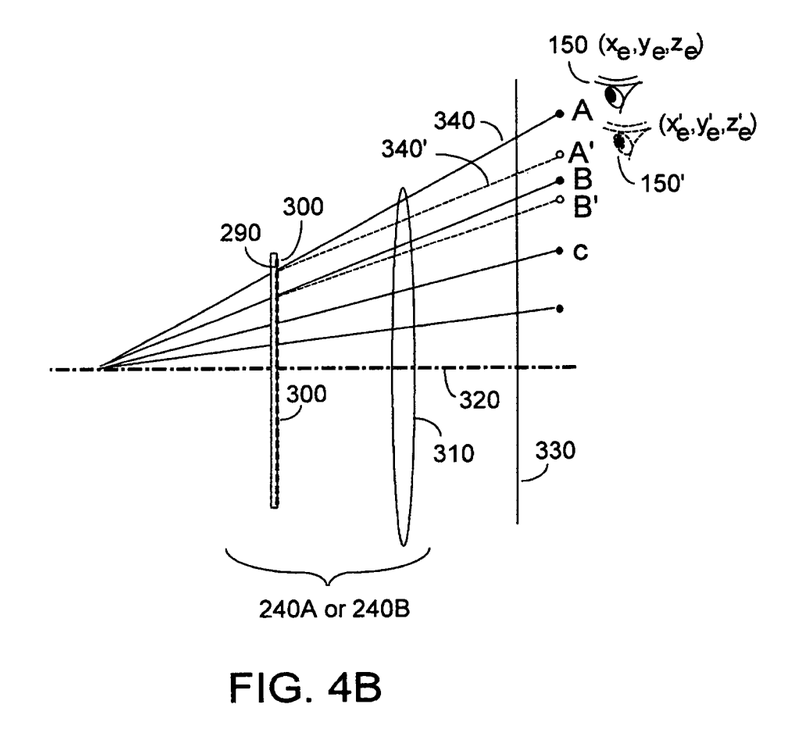
FIG. 4B depicts perceived positional error likely to result from uncorrected optical distortion, according to embodiments of the present invention.

As noted embodiments of the present invention relate to methods of using three-dimensional input data to enable two-dimensional game applications to render more realistic displays to enhance realism. However, successful interaction between game applications and the present realistically require the use of calibration information to un-distort images acquired by 240A, 240B. However as shown by the uncorrected image 280 in FIG. 4A of a perfectly regular rectilinear pattern of lines, pincushion error will be present. As shown in FIG. 4B, unless such pincushion error is corrected for, it can produce erroneous estimations of the direction of the game player's eye 150.

FIG. 4B depicts the problems created by uncorrected optical distortion. FIG. 4B depicts an image plane 290 of a two-dimensional camera, e.g., 240A, or 240B, and shows pixel sensors 300 thereon, typically formed as an array of rows and columns. When camera 240A or 240B captures an image, that image ideally is focused by camera lens 310, which has optical axis 320, upon image plane 290. Incoming optical energy is detected by the array of pixel sensors 300 on image plane 290. Depending upon the camera, pixel sensors 300 may be sensitive to visible light including monochrome and/or color RGB spectra, or to IR. As shown in FIG. 4B, an imaginary or virtual image plane 330 may be said to exist in the real world, with camera lens 310 midway between virtual image plane 330 and image plane 290. In real-world space, the actual position of the game player's eye 150 as the eye sights along a light ray 340 will be at A $(x_e, y_e, z_e)$. Unfortunately uncorrected optical distortion has the effect of appearing to shift the position of the game player's eye to spurious position A' $(x'_e, y'_e, z'_e)$, as though ray 340' were being sighted upon, rather than ray 340. Consequently, reconstructing a three-dimensional image projection from the perspective of the player's eye by the game application may not reflect the true position of the player's eye. Of course 150 could refer to another portion of the player, e.g., an arm, hand, torso, etc., and game gestures made by the player could be misinterpreted or go unrecognized. Thus, such uncorrected errors can diminish quality of game play, e.g., correctly aimed projectiles may miss their target, player gestures including natural gestures may be misinterpreted, etc.

Implementing target aiming using natural interfaces with a portable or handheld device (perhaps a smart phone) can be a challenging proposition. Referring to FIGS. 3A and 3B, it is natural to aim at a target 130 by having the game player align the player's eye, hand, etc., perhaps using a sight aiming object such as 140, e.g., a cross-hair. As seen best in FIG. 3C and FIG. 3D, the player's eye 150 and hand 100 are materialized in the real world and are located with real-world coordinates, whereas the aiming-assist 140 and target 130 are rendered in the virtual world using respective virtual world coordinates.

As noted with respect to FIGS. 3C and 3D, embodiments of the present invention can integrate real world coordinates and virtual world coordinates. According to embodiments of the present invention, this functionality enables the game application to be provided with sufficient information to render an aiming scene with realism and with high visual fidelity on display 10. For example, such realism may include a realistic depiction of the trajectory 50' of projectile 40 (a bird, a missile, an arrow, a stone, etc.). It should be understood that the aiming metaphor used herein is not limited to literally aiming a projectile at a target. In other embodiments and applications, without limitation the term "aiming" may mean "selecting", or "identifying" among several user interface targets, perhaps displayed objects such as button(s), slider(s), hot link(s), object edge(s), and so forth.

Figure 5A:
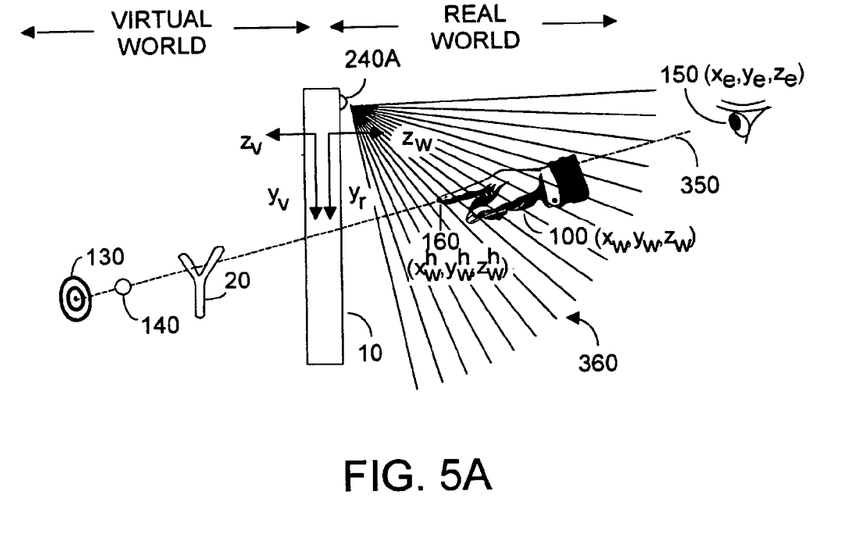
FIG. 5A depicts line-of-sight aiming in which the display includes a representation of the player, according to embodiments of the present invention.

FIG. 5A depicts successful implementation of line-of-sight aiming by which player 150 can look along site line 350 toward virtual target 130 in virtual game space. In this embodiment, the game scene is rendered on display screen 10 from the perspective of the game. As such, slingshot 20, or alternatively perhaps an aiming cross-hair 20 (or 140) is effectively coupled with the player's eye 150, and is effectively decoupled from the rest of the scene (e.g., trees, structures, birds, etc.). The game scene displayed will be governed by the game application, and any appropriate scene can be rendered as required by the flow of the game, responsive to player 100 interactions such as gestures.

In the embodiment of FIG. 5A, spaced-apart two-dimension cameras 240A, 240B are used to acquire three-dimensional image points of user 150, as described more fully in the referenced pending Imimtek, Inc. patent application. FIG. 5A shows the three-dimensional detection zone 360 defined by the intersecting fields of view of two-dimensional cameras 240A, 240B. (It is understood that camera 240B is spaced-apart from camera 240A by approximately the horizontal width of display screen 10, and would appear at that distance normal to the plane of the drawn image.) Player 150 sights along line 350 using slingshot 20 (or, alternatively perhaps a cross-hair 140) as an aiming guide.

Figure 5B:
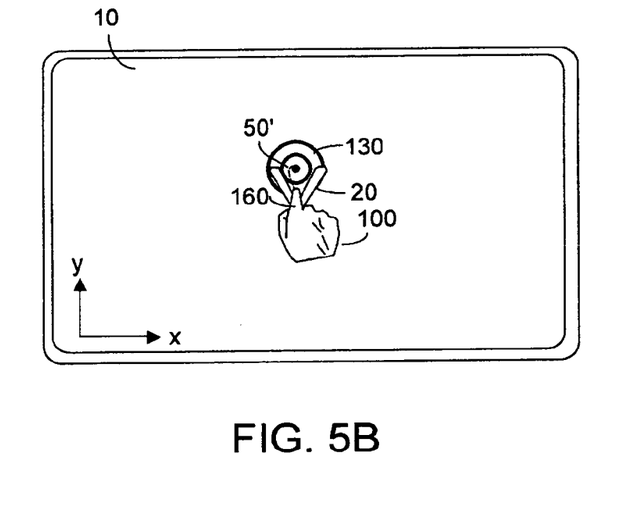
FIG. 5B depicts an image of the display for the configuration of FIG. 5A, according to embodiments of the present invention.

In the embodiment depicted in FIG. 5A and FIG. 5B, aiming and launching projectile 20 such that it will hit target 130 requires user 100 to align hand and finger 160 in the line-of-sight along cross-hair 20 (here shown as a slingshot) and target 130 (see FIG. 5B). For ease of illustration, the trajectory is now depicted in FIG. 5A as a line 350, and is shown as a curved trajectory 50' in FIG. 5B. Note that player 100 has aimed and launched projectile 20 accurately and a hit upon target 130 will result. The position of the player's hand 100 and eye 150 are present in the real world and will have real world three-dimensional coordinates, as shown. Target 130 and aiming guide 20 are rendered in the virtual game world and will have respective virtual game world coordinates. As was described with respect to FIGS. 3A-3D, the real world coordinates and the virtual game world coordinates preferably are integrated, according to embodiments of the present invention. The two-dimensional game application now has sufficient integrated three-dimensional virtual world coordinate information relating to position, velocity, acceleration, etc. to render upon display 10 the aiming scene with high visual fidelity. Consequently a very realistic game experience is provided for the player.

Figure 6A:
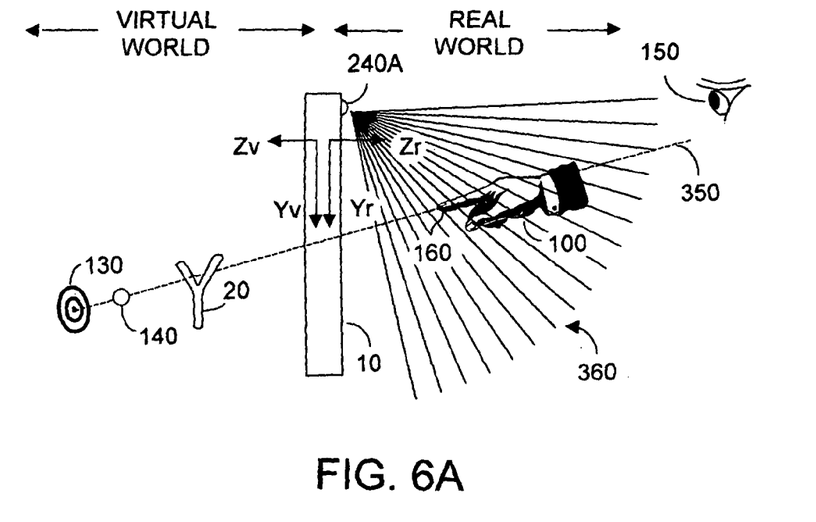
FIG. 6A depicts aiming in which the display is rendered from the viewpoint of the player's head, and does not include a representation of the player, according to embodiments of the present invention.

FIG. 6A is similar to FIG. 5A, but depicts at least one advantage of rendering game scenes from the player's eye point of view. In the embodiment in FIG. 6A, the game scene is rendered on display screen 10 from the perspective of the user's eye. But slingshot 20 (or alternatively perhaps a cross-hair 140) is effectively coupled with the player's hand and decoupled from the rest of the scene (e.g., trees, structures, birds, etc.) Thus if the player's hand is moved, slingshot 20 (or crosshair 140, or other object, appears to move in the rendered scene accordingly. But as long as the player's eye position is unchanged, the rest of the imagery rendered upon display 10 remains substantially unchanged.

Figure 6B:
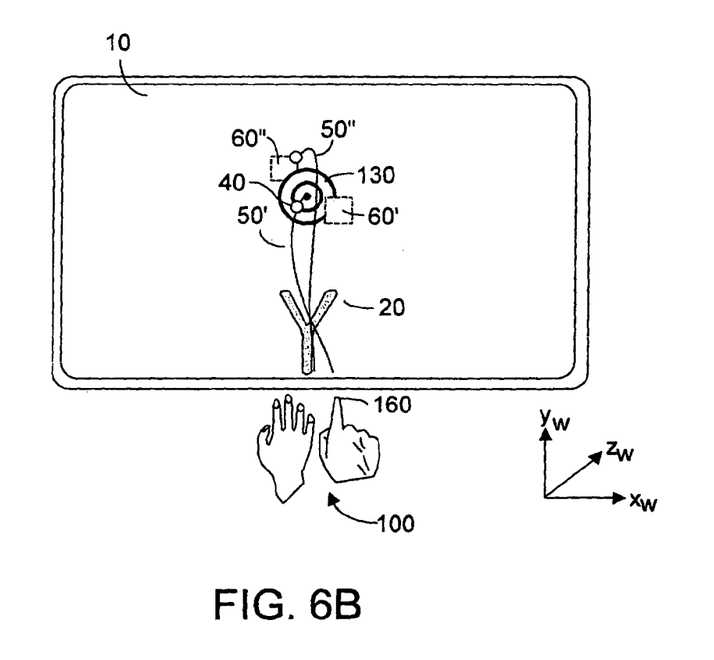
FIG. 6B depicts an image of the display from the player's point of view for the configuration of FIG. 6A, according to embodiments of the present invention.

An advantage of embodiments of the present invention with respect to target visibility and aiming is shown in FIG. 6A and FIG. 6B. In FIG. 6B, player 100 aims projectile 40 by aligning hand and finger 160 in a trajectory towards a desired target. Note that the embodiment of FIG. 6B also enables player 100 to interact with target 60', disposed in front of target 130, e.g., along the $z_w$ axis closer to display 10, as well as to interact with targets such as 60" disposed behind target 130, e.g., further away from display surface 10, along with $z_w$ axis. Indeed, alternate trajectory 50" depicts how player 100 has moved his or her hand and imparted sufficient virtual force to intentionally lob a projectile over target 130 to intentionally hit target 60" disposed behind target 130. Further, the player enjoys greater visibility of these alternate targets 60', 60". In some game applications, target 130 could be an obstacle, perhaps a mountain, disposed in front of a desired target 60". Alternatively, in some game applications if target 130 is the desired target but the projectile hits another target, perhaps 60' or 60", game points could be deducted from the player's score. The enhanced visibility and depth ordering (e.g., along axis $z_w$) of targets 60', 130, 60" in the embodiments of FIG. 6A and FIG. 6B contribute to a more realistic three-dimensional game experience for the player.

In many embodiments of the present invention, natural gesture recognition, enabled by the three-dimensional input data captured as the player interacts with the game application, is employed. Thus in FIG. 6B, a clenched player hand may be defined as one natural gesture, perhaps "sight target", and an open player hand may be defined as a second natural gesture, perhaps "fire". Of course many more hand gestures may be defined, and gestures can in addition or alternatively include, without limitation, movement of the hand(s), arm(s), torso, head, etc. As noted, strength of the player's pull upon slingshot 20 (or other aim/launch object) can be ascertained in terms of movement along the z-axis, away from (perhaps greater pull strength) or towards (perhaps less pull strength) display 10. Vector aiming of slingshot 20 (or other object) can be determined from the three-dimensional data gathered from player 100, e.g., by cameras 240A, 240B (see FIG. 2B), or by a time-of-flight camera (see FIG. 2B), or by any other three-dimensional acquisition system. As noted in FIG. 2B, the game device 220 may include hardware 230 that includes gyros, accelerometers (collectively 255), and the like. Further the physical screen of display 10 may be sensitive to the player's touch, or spaced-apart cameras 240A, 240B can be adjusted to sense touching of display 10. Such additional information from these sense mechanisms may be input by the present invention to the game application to communicate additional player movement information. Of course the player may simply place device 210 on a stationary object, perhaps a table top, in which case the player could use both hands to interact in three-dimensional real-world space with the game-playing device, or perhaps compete against another player, who is also interacting with the game-playing device.

Figure 7:
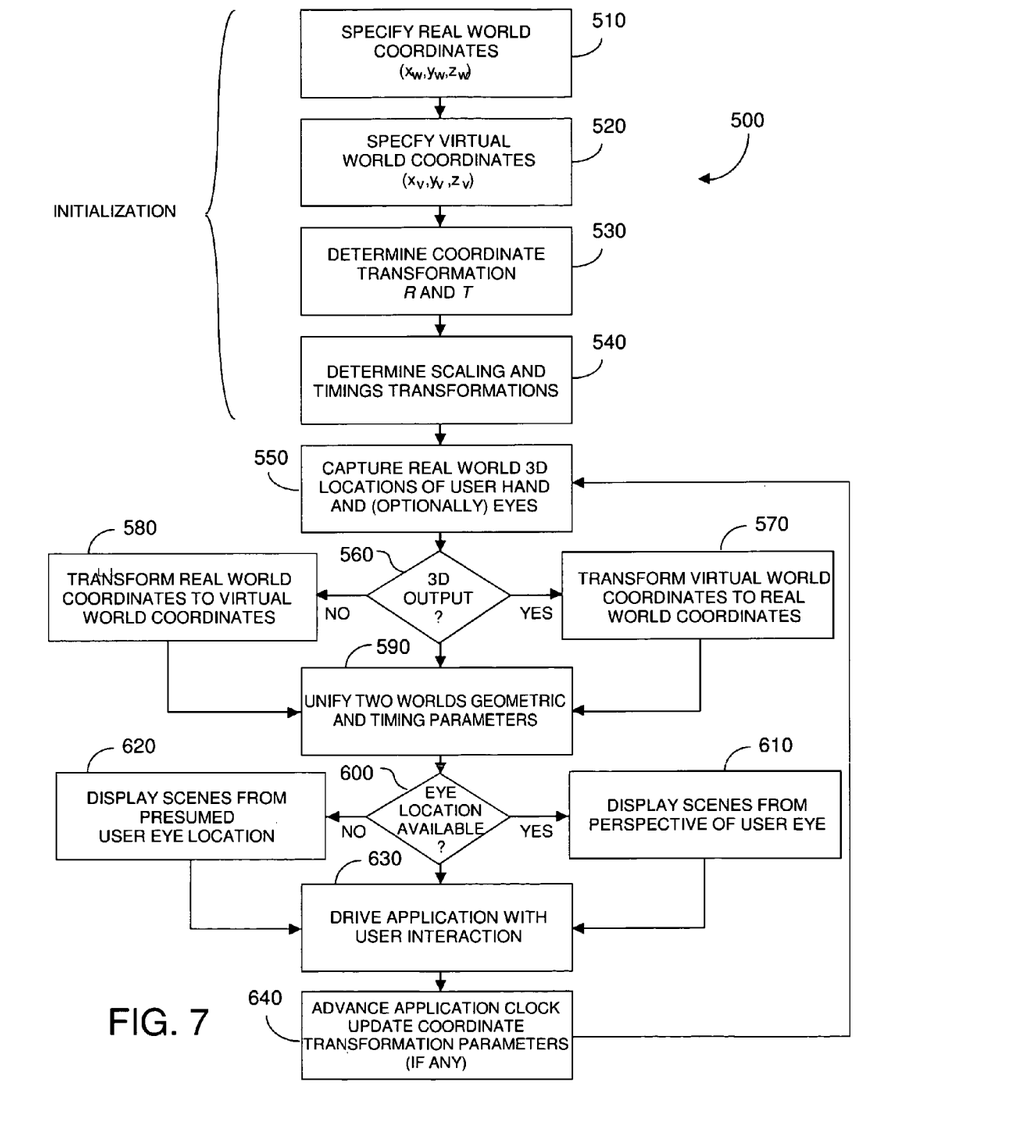
FIG. 7 is a block diagram showing a preferred method to carry out the present invention, according to embodiments of the present invention.

Recall that system 260 (in FIGS. 2A-2C) preferably implements embodiments of the present invention, and typically will include at least a processor 262, and memory 264 storing at least one processor 262 executable routine 266 implementing the present invention. As noted earlier, such system, 260 processor, memory, and routine execution functions may be shared or carried out by processor and memory capability within game device system 245. FIG. 7 depicts a flow chart 500 showing preferred method steps executed by system 260 to carry out embodiments of the present invention. FIG. 7 may be thought of as comprising two major blocks: initialization procedures (steps 510-540) that are directed to conventions and calculations relating to mapping between the real-world or physical-world and the virtual application world are carried out, and post-initialization run-time processing (steps 550-640) that are directed to exemplary run-time logic that repeats during operation of system 260. It is understood that if any assumptions regarding initial mapping parameters are changed at run-time, these parameters will be updated during run-time. For example, if device 220 (FIG. 2A, or device 210 in FIGS. 2B and 2C) changes its orientation at run-time (or game play), the x-y axes designations are updated accordingly to y-x axes.

Returning to FIG. 7, step 510 defines center, orientation and measurement units of the coordinate system, and other parameters of the physical real world associated with the game player (or user). By way of example the coordinate center can be assumed to be at the lower left corner of display 10, with orientation such that y represents the up/down direction, x the left/right direction, and z represents a direction toward the user. Preferably unit measurements are defined in mm although other orientations and units could instead be used. As step 510 concerns real-world objects, motion parameters are defined accordingly to correspond to real-world values, e.g., velocity may be on the order of cm/second, time measured per a wall clock, etc.

Step 520 in FIG. 7 specifies similar parameters in the game or application context. For example if game application 242 involves flying rockets, velocity measurements may be defined in kilometers per second. If game application 242 has already defined a three-dimensional virtual world, a system of three-dimensional coordinates will likely have already been defined. However if not, step 520 will add such a coordinate system and define its center. In practice a game or game application (e.g., 242, 242') may have many dynamic scenes and thus the virtual coordinate system parameters may be updated in each scene. Such updates preferably are carried out in FIG. 7 by method step 640.

Following method steps 510 and 520, given real world coordinate system $(x_w, y_w, z_w)$, and virtual coordinate system $(x_v, y_v, z_v)$, step 530 in FIG. 7 determines the geometric rotation (R) and translation (T) transformation parameters between these two coordinate systems. These geometric transformation parameters, which may be from real-to-virtual or from virtual-to-real, are needed for coordinate transformations (see steps 570 or 580).

Block 540 in FIG. 7 specifies mapping between scaling and timing (motion) parameters between real and virtual worlds. For example velocity in the virtual world may be at Mach-level magnitude, whereas velocity in the game player's real world may be in the magnitude of cm/sec. As an example of time scaling, a ten second clock time in real world may map to days or perhaps nanoseconds in the game virtual world. The scaling mapping between each coordinate may of course differ. For example, (x,y) scale mapping may be one-to-one, whereas z scale mapping may be one-to-ten. As noted earlier, as with geometric transformation, game application 242 may update scale and timing mappings at run-time, depending on scene changes, which updates are applied at method step 640.

Following method step 540, initialization typically has been completed and run-time loop application commences with method step 550. Of course the term "loop" does not mean that game application 242 is required to always follow a pre-determined loop. Instead, the game application logic may dictate that the application state follow a complex network of states. But for clarity of illustration and brevity, the game application run-time logic may be defined as a loop.

Refer now to FIG. 2A, FIG. 2B, and FIG. 7. In the embodiments of FIG. 2A and FIG. 2B, spaced-apart two-dimensional cameras 240A or 240B capture substantially simultaneous frames of the game player. Preferably module 250 and associated software (executable internally or running on the processor and memory of 260) performs three-dimensional reconstruction of centroid and other relatively few landmark points such as the player's fingertips, eye(s), face, etc., assuming these player body parts are within the overlapping fields of view of cameras 240A, 240B. These centroid and other locations are determined in three-dimensional real-world $(x_w, y_w, z_w)$ coordinates. Module 250 may also perform additional gesture processing to translate such three-dimensional real-world player data into a gesture language or commands for use by device 220. In FIG. 7, method step 550 represents such capture of real-world player data. At method step 630, the resultant gesture(s) or other command(s) are used to drive game application 242, 242' so as to interact, preferably highly realistically, with the game player.

Method step 560 in FIG. 7 determines whether system 210 or display 10 (FIG. 2A) supports some form of three-dimensional output, perhaps an auto-stereoscopic display. Step 560 further decides if three-dimensional output is optionally available, whether game application 242, 242' wants to make use of it to render a three-dimensional display on monitor screen 10. If the answer is affirmative, the method flow at step 560 branches right ('YES') to step 570. Of course, if system 210 does not support a form of three-dimensional output, or if the system wants to use a usual two-dimensional display, where both two-dimension and three-dimension options are available, at step 560 the method flow branches left ('NO') to step 580.

If three-dimensional display is desired, at step 570 preferably module 260 (see FIG. 2A) using processor 262, memory 264, routine 266 (and/or using equivalent functionalities within system 245), the locations of virtual objects in game space coordinates $(x_v, y_v, z_v)$ are translated to world coordinates $(x_w, y_w, z_w)$, commensurate with the three-dimensional output coordinate system. These translations preferably use transformation parameters obtained at step 530, or as updated at step 640. Note that even if a three-dimensional object appears to materialize in the real world (e.g., FIG. 3D), the real world location whereat it appears is somewhat related to the perception of the game player. Understandably it is desirable to properly determine the scale of this transformation. Thus, a game object like a ball should be rendered so as to appear on display screen 10 to be reachable by and interactable with the game player's hand.

In FIG. 7, if a usual two-dimensional display is desired, embodiments of the present invention within module 260 (e.g., FIG. 2A) can use processor 262, memory 264 and routine 266 to carry out a reverse translation from world coordinates $(x_w, y_w, z_w)$ to virtual game space coordinate $(x_v, y_v, z_v)$. However as noted, processor functions, storage functions, etc. preferably are shared between system 260 and system 245, in which case processor 244 in system 245 may be used to carry-out such functions. Indeed in some embodiments some or all of routine 266 can be stored in memory 241 in system 245. Such reverse translation preferably will use transformation parameters obtained at step 530, or updated at step 640. In practice, the real world objects typically are obtained from player gestures and other data, and represent player hand, perhaps finger tips, facial coordinates, etc; see method step 550 in FIG. 7.

It is desired to properly determine scale of the above noted transformations. For example, a representation of the player should appear to reach a game object such as a ball in virtual game space. Regardless of direction of translation at step 570 or step 580, a unification of geometric and timing scaling is preferably carried out at step 590 within system 260 to produce a unified real/virtual coordinates system $(x_u, y_u, z_u, t_u)$. For instance, in a given game application a projectile that travels at Mach magnitude speed along a trajectory may be slowed to slower speeds commensurate with the real world speed of player hand movements. Alternatively, in some applications real world speed of player hand movements must be up-scaled to Mach magnitude of virtual world speeds commensurate with the game application. Thus if the processing flow to method step 590 arrives from method step 580, then $(x_u, y_u, z_u, t_u)$ is closer or the same as $(x_v, y_v, z_v, t_v)$, and if the processing flow to method step 590 arrived from method step 570, then $(x_u, y_u, z_u, t_u)$ is closer or the same as $(x_w, y_w, z_v, t_w)$.

FIG. 7, method step 600 governs the perspective by which the game application display content is rendered, either on a two-dimensional screen display, or on a real world three-dimensional rendering. For example, if method step 550 provides player eye location, game application 242 or 242', running within game system 245, draws a two-dimensional or three-dimensional rendering of the game application scene from the perspective of the game player's eye; see method step 610. If the player eye location is not available or not needed, game application 242 or modified 242', again running within game system 245, draws a two-dimensional or three-dimensional rendering of the game application scene. This rendering will be according to the internal rules of the game application, or from the perspective of the perceived location of user eye; see method step 620.

Method step 630 in FIG. 7 is directed to the interaction between the game application 242 or 242' logic, and processed player input from method step 550, following the aforementioned translations, scaling and unification steps that drive the game application. Referring to an exemplary aiming game application, the targeting (using slingshot 20 or crosshair 140 (see FIG. 2A and FIG. 3A-3D) and the launching of projectile 40 (see FIG. 2B or FIG. 2C) are performed at method step 630, per game application software modules 242 or 242'.

At method step 640, the game application clock (or in a more general term, the game application logic) is advanced to the next state. If the current state of the game application requires updating any coordinate transformation, timing or scaling parameters between the virtual world coordinates and real world coordinates (as described for steps 530 and 540), such parameters are updated at method step 640. The previous steps in the loop, namely steps 570, 580, 590, will use the updated information for their computation that takes place in system module 260, for use by game system module 245.

In some instances it is desirable or necessary to alter game application 242 to enable it to function smoothly with information provided to it by the present invention. For example, referring to entry [C2] in Table 1, a game application 242 may support internal virtual three-dimensional coordinates, but the method to drive that application is a traditional two-dimensional input, e.g., a touch display screen, a keyboard, etc. The game application may already map two-dimensional inputs (e.g., CTRL (Control) key+up/down arrow keys) to the z-dimension for complete virtual three-dimensional actions. More specifically, operation of these arrow keys may change $z_v$ values in game application $(x_v, y_v, z_v)$ coordinates while maintaining the values of $x_v$ and $y_v$. Substantially simultaneously values of $x_v$ and $y_v$ may be changed using the left/right and up/down arrow keys, without the CTRL key, and can be assigned to change values of $x_v$ and $y_v$, correspondingly. But clearly, in the absence of good three-dimensional input $(x_w, y_w, z_w)$, the player-game interaction will not be very natural. Thus it is desirable to modify this game application to make the application aware of the three-dimensional input data, e.g., $(x_w, y_w, z_w)$ originally gathered by system 230. In essence, game application 242 is modified to game application 242' to behave like an application in category [C3] in Table 1. In a preferred embodiment, the transformations in method steps 580 and 590 (see FIG. 7) can be performed in module 260 (see FIG. 2A). The resulting $(x_v, y_v, z_v)$ values are then mapped to key codes for left/right, up/down, and CTRL up/down keys, just as if the game player were entering these keys to interact with the game application. A further step in modifying game application 242 can bypass translation from three-dimensional $(x_w, y_w, z_w)$ input data to two-dimensional (keyboard keys) input data, and from two-dimensional to three-dimensional $(x_v, y_v, z_v)$ coordinates. Further, the method steps of system 266 may be integrated into system 242 resulting in an incarnation of modified game application 242'.

It is understood that embodiments of the present invention may be used with game and/or with other applications that can respond to three-dimensional input. As noted devices executing such application may include mobile or handheld platforms including smart phones, tablets, portable game consoles, laptop and netbook computers, in addition to non-mobile platforms, perhaps PCs, TVs, entertainment boxes, among other appliances. Those skilled in the art will appreciate that, in addition to enhancing game playing, embodiments of the present invention could also be deployed to enable a user to manipulate menu(s) rendered on a display screen, to engage virtual selection button(s) rendered on a display screen, etc.

Modifications and variations may be made to the disclosed embodiments without departing from the subject and spirit of the invention as defined by the following claims.

What is claimed is:

1. A system enabling a game application, characterizable in at least three game-world $(x_v, Y_v, z_v)$ coordinates and an implicit fourth $(t_v)$ time coordinate, and executed by a game device coupled to a display, to respond to at least a natural gesture three-dimensional $(x_w, y_w, z_w)$ input and an implicit fourth $(t_w)$ time input generated from a player interacting with said game application to enable said game application to present player-interactable depth on said display, the system comprising:

said display, coupled to said system to render images commensurate with player interaction with said game application;

an optical acquisition system to acquire at least three-dimensional $(x_w, y_w, z_w, t_w)$ data representing player interaction with said game application;

means for recognizing from sensed at least said $(x_w, y_w, z_w, t_w)$ data acquired by said optical acquisition system at least one player gesture;

said optical acquisition system to acquire at least three-dimensional $(x_w, y_w, z_w, t_w)$ data and said means for recognizing from sensed at least said $(x_w, y_w, z_w, t_w)$ data including at least spaced-apart first and second two-dimensional cameras whose overlapping fields of view acquire images including data representing potential landmark points and data imaging at least a portion of interaction by said player with said game application;

executable software, coupled to said first and second two-dimensional cameras, to represent said player from acquired said images using as least some said landmark points from which at least one user gesture is discernible;

means for mapping acquired said $(x_w, y_w, z_w, t_w)$ and virtual game-world $(x_v, y_v, z_v, t_v)$ coordinates into a unified four dimensional scaled coordinate system $(x_u, y_u, z_u, t_u)$;

means for using at least one of mapped and scaled said unified-world ($x_u$, $y_u$, $z_u$, $t_u$) coordinates to cause said game application to react to said ($x_w$, $y_w$, $z_w$) data acquired by said optical acquisition system; and means for causing, said game application to render at least one image on said display responsive to said means for using;

wherein said display and game interaction is rendered from a perception viewpoint of said player; and wherein said game application is characterized by a representation selected from a group consisting of (i) a two-dimensional virtual representation, and (ii) a three-dimensional virtual representation.

2. The system of claim 1, wherein said display and said game device share a common housing.

3. The system of claim 2, wherein said game device is selected from a group consisting of (a) a smart phone, (b) a portable device, (c) a hand-held device, (d) a netbook, and (e) a laptop.

4. The system of claim 1, further including means for scaling mapped said at least virtual game-world ($x_v$, $y_v$, $z_v$) coordinates;

wherein said means for causing uses mapped and scaled said game-world ($x_v$, $y_v$, $z_v$) coordinates to cause said game application to react to acquired said ($x_w$, $y_w$, $z_w$) data.

5. The system of claim 1, wherein acquired said ($x_w$, $y_w$, $z_w$, $t_w$) data represents at least one natural interface gesture interaction by said player with said game application, said natural interface gesture including at least one gesture selected from a group consisting of (i) an open hand of said player, (ii) a clenched hand of said player, (iii) a movement of a hand of said player, (iv) a movement of an arm of said player, (v) a movement of a torso of said player, and (vi) a movement of a head of said player.

6. The system of claim 1, further including means for mapping acquired said ($x_w$, $y_w$, $z_w$, $t_w$) data to virtual game-world ($x_v$, $y_v$, $z_v$, $t_v$) coordinates such that a representation of said player is also rendered on said display.

7. The system of claim 1, wherein said optical acquisition system includes a time-of-flight camera and associated software to acquire images from which at least one user natural gesture is discernible.

8. The system of claim 1, wherein said game device includes at least one of a gyroscope and an accelerometer, and player interaction with said game application includes player physical manipulation of said device.

* * * * *